United States Patent
Kim et al.

(10) Patent No.: US 10,180,227 B2
(45) Date of Patent: Jan. 15, 2019

(54) APPARATUS FOR DRIVING HEADLAMP SHIELD

(71) Applicant: Hyundai Motor Company, Seoul (KR)

(72) Inventors: Young Min Kim, Seoul (KR); Yang Gi Lee, Gyeonggi-do (KR); Jae Hun Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 414 days.

(21) Appl. No.: 14/960,641

(22) Filed: Dec. 7, 2015

(65) Prior Publication Data

US 2017/0089539 A1 Mar. 30, 2017

(30) Foreign Application Priority Data

Sep. 24, 2015 (KR) .................. 10-2015-0135193

(51) Int. Cl.
*B60Q 1/14* (2006.01)
*F21S 41/698* (2018.01)
*F21S 41/60* (2018.01)
*F21S 41/689* (2018.01)
*F21S 41/162* (2018.01)

(52) U.S. Cl.
CPC .......... *F21S 41/698* (2018.01); *B60Q 1/1438* (2013.01); *F21S 41/60* (2018.01); *F21S 41/689* (2018.01); *B60Q 2300/056* (2013.01); *F21S 41/162* (2018.01)

(58) Field of Classification Search
CPC ............... F21S 48/1778; F21S 48/1705; F21S 48/1794; B60Q 1/1438
See application file for complete search history.

(56) References Cited

U.S. PATENT DOCUMENTS

| 9,528,677 B2* | 12/2016 | Mochizuki | F21S 48/1778 |
| 9,765,939 B2* | 9/2017 | Lee | F21S 48/1778 |
| 2005/0201117 A1* | 9/2005 | Sugimoto | F21S 48/1794 362/539 |
| 2014/0092617 A1* | 4/2014 | Yokoi | F21S 41/698 362/512 |

FOREIGN PATENT DOCUMENTS

| JP | 2001-118410 A | 4/2001 |
| JP | 2002-056707 A | 2/2002 |
| JP | 2010-086863 A | 4/2010 |
| KR | 10-0832516 B1 | 5/2008 |
| KR | 2014-0133315 A | 11/2014 |
| KR | 2015-0060232 A | 6/2015 |
| KR | 10-1537227 B1 | 7/2015 |

* cited by examiner

*Primary Examiner* — Anabel Ton
(74) *Attorney, Agent, or Firm* — Mintz Levin Cohn Ferris Glovsky and Popeo, P.C.; Peter F. Corless

(57) ABSTRACT

An apparatus for driving a headlamp shield is provided, which simplifies the operation structure of a bi-functional headlamp shield to reduce costs and improve quality. The apparatus includes a shield that rotates integrally with a rotary shaft thereof, and a coil section formed to cylindrically surround the rotary shaft, and that is configured to generate an electromagnetic force for moving the rotary shaft in a linear trajectory when a current is applied to the coil section. Further, a motion direction switching component adjusts the linear axial movement of the rotary shaft to axial rotation thereof.

7 Claims, 5 Drawing Sheets

[ HIGH BEAM MODE ]

[ LOW BEAM MODE ]

APPARATUS FOR DRIVING HEADLAMP SHIELD

CROSS-REFERENCE TO RELATED APPLICATION

This application claims under 35 U.S.C. § 119(a) the benefit of priority to Korean Patent Application No. 10-2015-0135193 filed on Sep. 24, 2015, the entire contents of which are incorporated herein by reference.

BACKGROUND (a) Technical Field

The present disclosure relates to an apparatus for driving a headlamp shield and more particularly, to an apparatus for driving a headlamp shield, to simplify the operational structure of a bi-functional headlamp shield to reduce costs and improve quality.

(b) Background Art

Generally, vehicles include lighting devices which are used to illuminate objects in a traveling direction to be more easily view the objects when the vehicles travel during low light conditions (e.g., at night), and for signaling to inform other vehicles or road users of the vehicles operational state. Among vehicle lighting devices, headlamps, (e.g., headlights), are mounted at both ends of the front side of a vehicle to illuminate the path of the vehicle when traveling forward during low light conditions, thereby securing the driver's view in the traveling direction. Typically, headlamps require brightness for identifying front obstacles located a certain distance ahead on the road, and must diffuse light to illuminate the surrounding environment.

Additionally, headlamps should not obstruct the activity of drivers in crossing and on-coming vehicles due to glare or the like. For example, headlamps include a low beam mode and a high beam mode, which are switched therebetween by a driver's operation. To switch between and selectively use the low and high beam modes, conventional headlamps include low beams, that are turned on and used in an ordinary state during low light conditions, and high beams, which are turned on and used primarily in low traffic areas where streetlights or other vehicles are not typically present.

However, since light is illuminated using respective reflectors and lenses, and since respective components for the high and low beams are installed in the headlamps, a large space is required for components and the installation thereof. Accordingly, a bi-functional headlamp, that includes a shield driving device (e.g., a light distribution direction switching device) having a rotary shield to illuminate high-beam light (e.g., a high beam) and low-beam light (e.g., a low beam) that uses a single light source (e.g. an HID lamp), is typical used. The bi-functional headlamp illuminates high-beam light or low-beam light and adjusts the light reflected from the reflecting surface of a reflector via the shield driving device. In particular, the shield driving device is an actuator, and rotates the shield to have the 1 light illuminated downward (e.g., a low beam mode), or is simultaneously illuminated upward and downward (e.g., a high beam mode).

The above information disclosed in this section is merely for enhancement of understanding of the background of the invention and therefore it may contain information that does not form the prior art that is already known in this country to a person of ordinary skill in the art.

SUMMARY

The present invention provides an apparatus for driving a headlamp shield, that simplifies the operation structure of a shield to engage a high beam mode and a low beam mode, and thereby reduces cost and power consumption.

According to an exemplary embodiment, an apparatus for driving a headlamp shield may include a shield configured to rotate integrally with a rotary shaft thereof, a coil section formed to cylindrically surround the rotary shaft, and configured to generate an electromagnetic force to move the rotary shaft in a linear trajectory when a current is applied to the coil section, and a motion direction switching component may adjust a linear axial movement of the rotary shaft to axial rotation thereof. The motion direction switching component may include a rotation guide groove formed in an exterior peripheral surface of the rotary shaft to extend in a diagonal direction. A fixing pin may include, a first end inserted into the rotation guide groove while a second end thereof may be fixed to one side of a base plate to fixedly support the coil section. The fixing pin may move along the rotation guide groove when the rotary shaft moves linearly.

The base plate may include a coil support portion that fixedly supports the coil section, and rotary shaft support portions that support both ends of the rotary shaft of the shield. In particular, the rotary shaft may move in a linear trajectory and be axially rotatable. The other end of the fixing pin may be fixed to the rotary shaft support portions. The rotation guide groove may be formed in at least one end of the rotary shaft of the shield. The apparatus may further include a restoring spring that may be compressed or stretched when the rotary shaft moves linearly. The restoring spring may return the rotary shaft via an elastic restoring force generated while being compressed or stretched, when supply of the current applied to the coil section is interrupted.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1A:
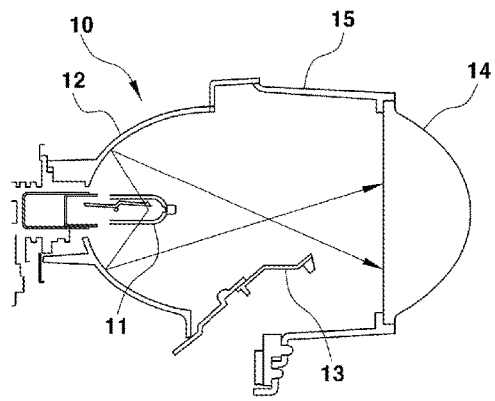
FIGS. 1A and 1B are exemplary views illustrating a headlamp optical system according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1B:
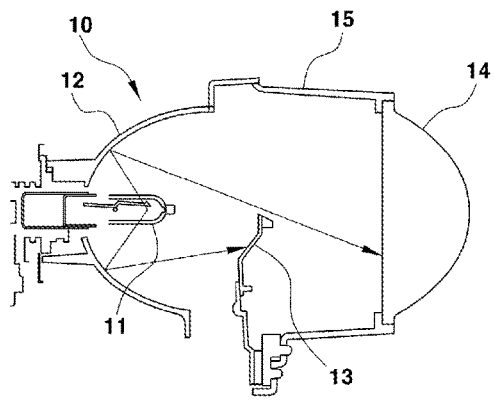
Figure 2:
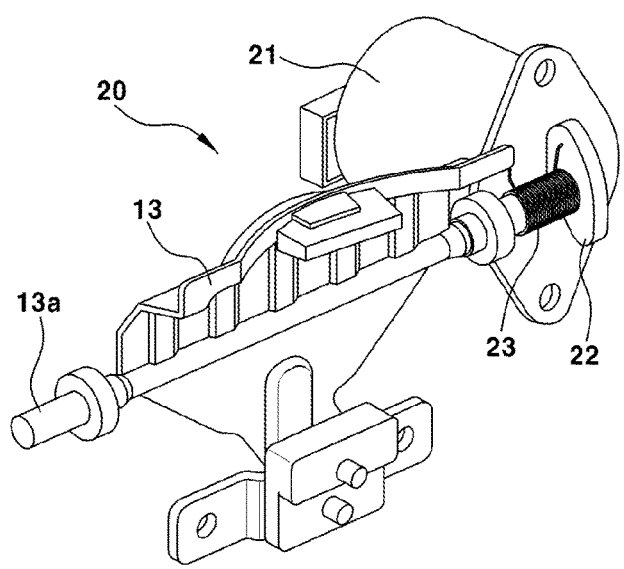
FIG. 2 is an exemplary view illustrating a device for driving a headlamp shield according to the related art.

FIGS. 1A and 1B are exemplary views illustrating a headlamp optical system according to the related art. FIG. 2 is an exemplary view illustrating a device for driving a headlamp shield according to the related art. Referring to FIGS. 1A and 1B, a conventional bi-functional headlamp 10 includes a light source 11 that emits light, a reflector 12 which reflects the light from the light source 11, an aspheric lens 14 that allows the light illuminated from the reflector 12 to shine straight ahead, a rotary shield 13 which rotates to obstruct a portion of the light illuminated to the aspheric lens 14 or to release the obstruction of the light, and a lens holder 15 that support the aspheric lens 14.

As illustrated in FIG. 2, the conventional bi-functional headlamp 10 includes a shield driving device 20 that rotates the shield 13. The shield driving device 20 includes a solenoid 21 that provides actuation force for rotating the shield 13, a lever 22 that transfers the actuation force generated by the solenoid 21 to the shield 13, and a restoring spring 23 which provides elastic restoring force for returning the shield 13 rotated by the actuation force of the solenoid 21. The shield 13 rotates along with the rotation of the lever 22, which is integrally and rotatably connected to a shield rotary shaft 13a, by the solenoid 21. Accordingly, the shield 13 obstructs a portion (e.g., high-beam light) of the light illuminated to the aspheric lens 14 or releases the obstructions of the light. The bi-functional headlamp activates a high beam mode when light is emitted while the shield 13 rotates about the shield rotary shaft 13a and is disposed in a planer position (e.g., laid down), whereas it activates a low beam mode when light is obstructed while the shield 13 rotates and is erected.

The bi-functional headlamp activates the high and low beam modes to have the solenoid 21, operatively connected to the lever 22, and mounted to the end of the shield rotary shaft 13a, and the shield 13 is rotated by the actuation force provided by the solenoid 21. Additional components are used to adjust the force, which acts in a linear direction due to the structure of the lamp, to rotational torque. Additionally, a significant amount of power is consumed in the process of adjusting the linearly acting force to the rotational torque.

Hereinafter reference will now be made in detail to various exemplary embodiments of the present invention, examples of which are illustrated in the accompanying drawings and described below.

Figure 3:
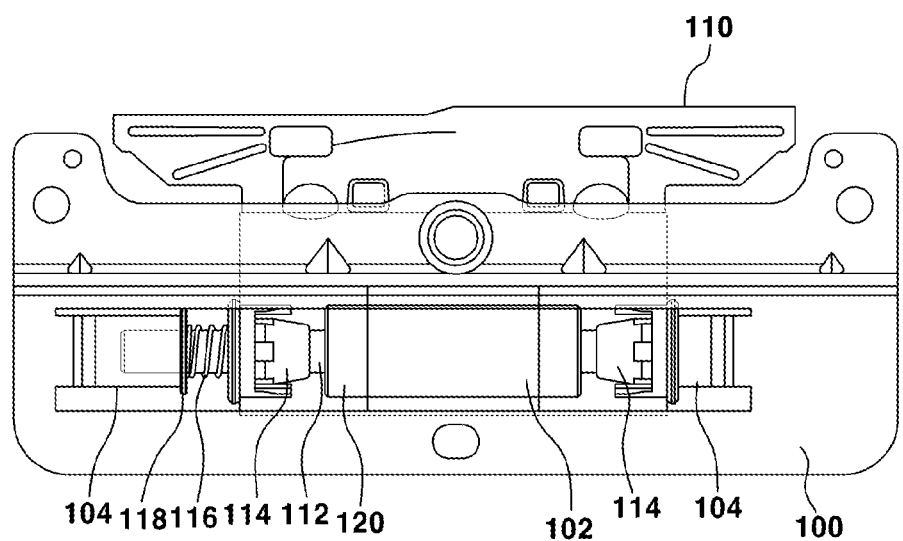
FIGS. 3 and 4 are exemplary views illustrating an apparatus for driving a headlamp shield according to an exemplary embodiment of the present invention.
Figure 4:
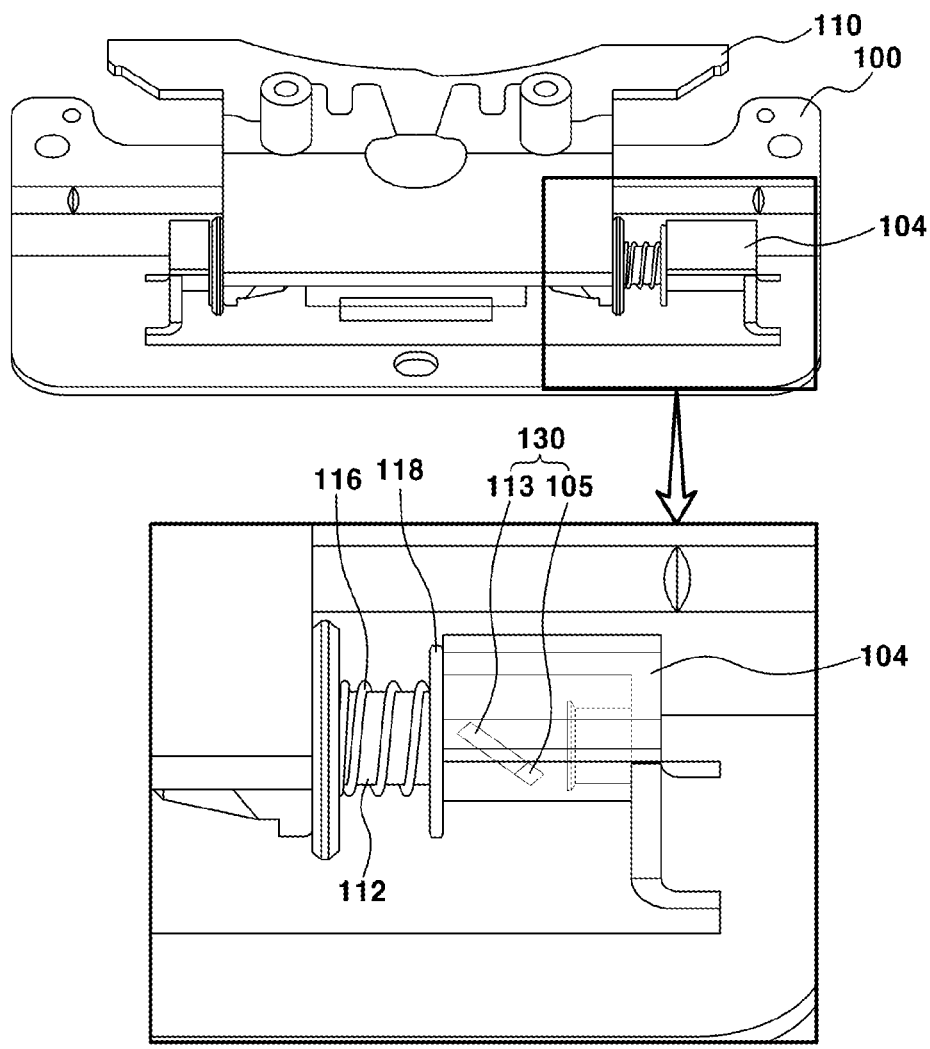

FIGS. 3 and 4 are exemplary views illustrating an apparatus for driving a headlamp shield according to an exemplary embodiment of the present invention. FIGS. 3 and 4 illustrate a shield 110 that may rotate to be disposed in a planer position (e.g., laid down) when a headlamp activates a high beam mode and to be erected when it activates a low beam mode, a coil section 120 that moves a rotary shaft 112 of the shield 110 to rotate the shield 110, a base plate 100 that supports the coil section 120 and the rotary shaft 112, etc.

The shield 110 may be used to realize the bi-function of the headlamp, such as the high beam mode and the low beam mode. The shield 110 may be rotated and disposed in a planer position to simultaneously illuminate the light upward and downward toward an aspheric lens (not shown). Further, the shield may be rotated and erected to illuminate light downward toward the aspheric lens. The upper end portion of the shield 110 may obstruct a portion of the light illuminated to the aspheric lens when the shield 110 is disposed in an erected position, to produce the low beam mode. The rotary shaft 112 may be integrally coupled to the lower end portion of the shield 110 to rotate the shield 110. The rotary shaft 112 may be coupled via coupling medium portions 114 to rotate integrally with the shield 110. The coil section 120, which is cylindrically wound along the longitudinal direction of the rotary shaft 112, may be formed on the exterior peripheral surface thereof.

The coupling medium portions 114 may be fixedly assembled to both ends of the rotary shaft 112. The coil section 120 may be disposed at the central portion of the rotary shaft 112 to prevent interference with the linear movement and axial rotation of the rotary shaft 112. For example, the coil section 120 may surround the rotary shaft 112 having the interior peripheral surface of the coil section 120 separated apart from the exterior peripheral surface of the rotary shaft 112 by a pre-determined distance. For example, the base plate 100 may include a coil support portion 102 that fixedly support the coil section 120, and rotary shaft support portions 104 that supports both ends of the rotary shaft 112 and the rotary shaft may be linearly movable and axially rotatable. The base plate 100 may be formed to prevent interference with the rotation of the shield 110. The coil support portion 102 may be formed between the rotary shaft support portions 104, which are spaced apart from each other at both sides of the base plate, to fix the coil section 120.

Although not illustrated in the drawings, the base plate 100 may be fixedly coupled at one side of the lens holder (e.g., reference numeral 15 in FIGS. 1A and 1B) of the headlamp, or at one side of the reflector (e.g., reference numeral 12 in FIGS. 1A and 1B), to support the rotary shaft 112 of the shield 110 and the coil section 120. The coil section 120 may generate a magnetic field when a current is applied thereto. In other words, the rotary shaft 112 may be made of a steel material to reinforce the magnetic field and electromagnetic force formed in the coil section 120. The rotary shaft 112 may be linearly axially movable by the electromagnetic force acting within the coil section 120. To adjust the linear movement to axial rotation, a motion direction switching component 130 may be positioned between the rotary shaft 112 of the shield 110 and any one of the rotary shaft support portions 104 of the base plate 100. The motion direction switching component 130 may be configured to adjust the linear axial movement of the rotary shaft 112 to the axial rotation thereof. Further a rotation guide groove 113 that operates a guide rail, and a fixing pin 105 that operates as a guide pin may be included.

Figure 5:
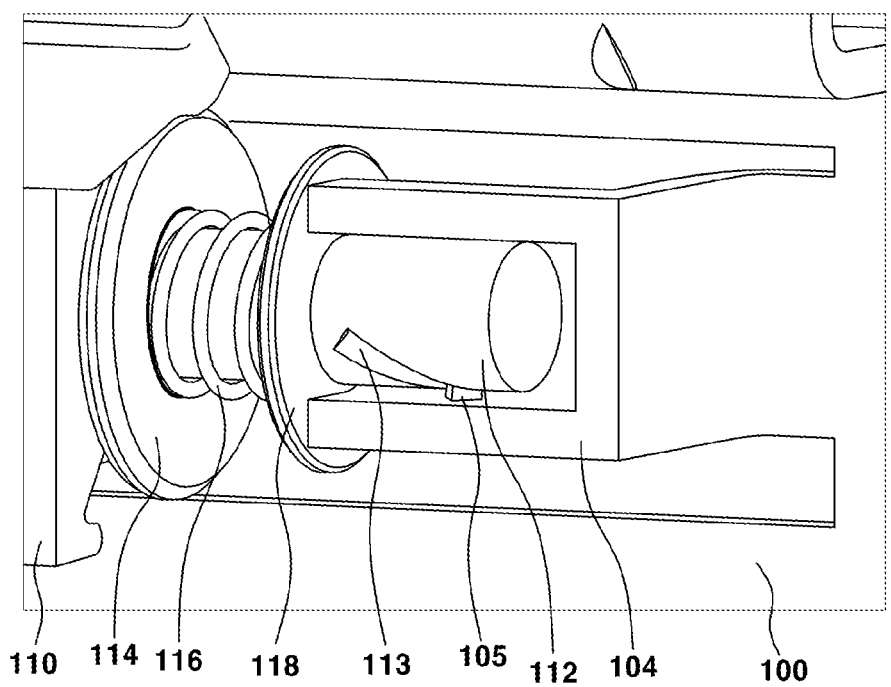
FIG. 5 is an exemplary enlarged view illustrating main portions in the apparatus for driving a headlamp shield according to an exemplary embodiment of the present invention.

Referring to FIGS. 3, 4, and 5, the rotation guide groove 113 may be formed in the exterior peripheral surface of the rotary shaft 112 to extend in a diagonal direction that intersects with the axial direction thereof. One end of the fixing pin 105 may be inserted into the rotation guide groove 113, and the other end thereof may be fixed to one side of the base plate 100 (e.g., inside any one of the rotary shaft support portions 104). In other words, the fixing pin 105 may be formed, (e.g., a protruding form), within the rotary shaft support portion 104 that has a space therein and may be inserted into the space and be supported by one end of the rotary shaft 112.

The rotation guide grove 113, into which one end of the fixing pin 105 is inserted, may be formed in the exterior peripheral surface of one end of the rotary shaft 112, that may be inserted into the rotary shaft support portion 104. The rotation guide grove 113 may be formed in at least one of the left and right ends of the rotary shaft 112. The fixing pin 105 may be configured to move along the rotation guide groove 113 when the rotary shaft 112 linearly moves, and accordingly the rotary shaft 112 may axially rotate along with the shield 110. Additionally, the rotary shaft 112 may include a restoring spring 116 that may be stretched when the rotary shaft 112 linearly moves, based on of the movement direction of the rotary shaft 112 that moves linearly by the electromagnetic force of the coil section 120. For example, as illustrated in FIGS. 3 to 5, the restoring spring 116 may be assembled on the outer peripheral surface of the rotary shaft 112 having both ends of the restoring spring fixedly coupled between the coupling medium portion 114 and a spring support portion 118. Thus, the restoring spring 116 may generate an elastic restoring force that returns the rotary shaft 112 while being stretchably deformed when the rotary shaft 112 moves in a linear trajectory.

Alternatively, although not illustrated in the drawings, the restoring spring 116 may generate an elastic restoring force for returning the rotary shaft 112 while being compressively deformed when the rotary shaft 112 moves in a linear trajectory. For example, the restoring spring 116 may be coupled to at least one of the left and right ends of the rotary shaft 112, and may generate an elastic restoring force while being compressed or stretched based on the assembly position thereof. Further, the spring support portion 118 may be fixedly coupled to one side of the rotary shaft support portion 104.

Figure 6:
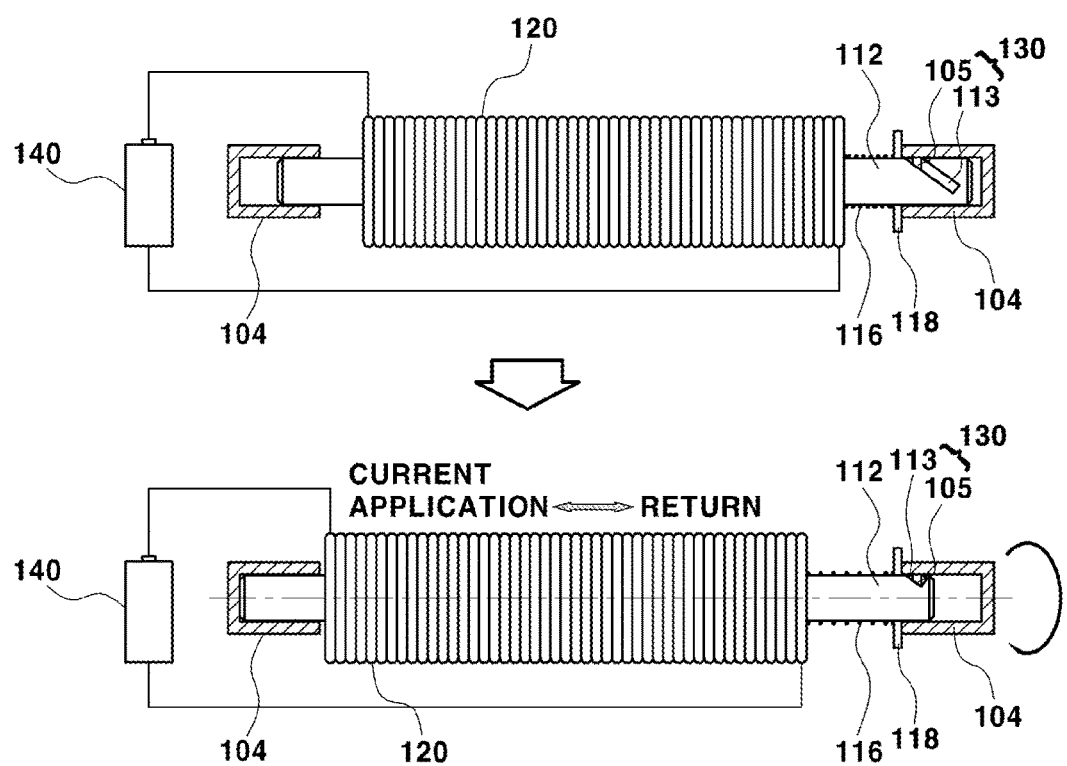
FIG. 6 is an exemplary view illustrating the state of operation of the apparatus for driving a headlamp shield according to an exemplary embodiment of the present invention.

Moreover, FIG. 6 schematically illustrates the state in which the linear movement of the rotary shaft 112 may be adjusted to the axial rotation thereof, the shield 110 being omitted. As illustrated in FIG. 6, when a current is applied to the coil section 120 from a power section 140 connected thereto, the rotary shaft 112 may move in a linear trajectory in one direction by the electromagnetic force formed in the coil section 120. In other words, the fixing pin 105 may be inserted into the rotation guide groove 113 to move along the rotation guide groove 113 in a diagonal direction on the exterior peripheral surface of the rotary shaft 112. Accordingly the rotary shaft 112 may move in a linear trajectory while axially rotating.

Furthermore, although not illustrated in the drawing, the shield 110 may be rotated and disposed in a planer orientation (e.g., laid down) to prevent the shield 110 from obstructing the illuminated light, and thus the headlamp may activate a high beam mode. When the supply of the current applied to the coil section 120 is interrupted, the elastic restoring force generated when the restoring spring 116 is stretched may act to initiate or resume movement of the rotary shaft 112. Accordingly, the apparatus for driving a headlamp shield according to the present invention may realize an electromagnetic structure using the rotary shaft 112 of the shield 110 as a core. Accordingly, the rotation structure of the shield 110 may be simplified compared to existing bi-functional headlamps. Consequently, the number of components and costs may be reduced and a quality may be improved.

As is apparent from the above description, the present invention provides an apparatus for driving a headlamp shield, which has a simplified structure for realizing a high beam mode and a low beam mode, without additional components for adjusting force, acting in a linear direction, to rotational torque to realize the high beam mode. Therefore, the number of parts and costs may be reduced and quality may be improved, and a reduction in power consumption, may be achieved, compared to conventional devices.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An apparatus for driving a headlamp shield, comprising:
   a shield that rotates integrally with a rotary shaft;
   a coil section formed to cylindrically surround the rotary shaft, and configured to generate an electromagnetic force that moves the rotary shaft in a linear trajectory when a current is applied to the coil section; and
   a motion direction switching component configured to adjust linear axial movement of the rotary shaft to axial rotation thereof,
   wherein the rotary shaft is coupled through coupling a plurality of medium portions to rotate integrally with the shield.

2. The apparatus of claim 1, wherein the motion direction switching component includes:

a rotation guide groove formed in an exterior peripheral surface of the rotary shaft to extend in a diagonal direction; and a fixing pin, having a first end inserted into the rotation guide groove and a second end coupled to one side of a base plate to support the coil section, when the rotary shaft moves in a linear trajectory the fixing pin moves along the rotation guide groove.

3. The apparatus of claim 2, wherein the base plate includes, a coil support portion that fixedly supports the coil section; and rotary shaft support portions that support the first and second ends of the rotary shaft of the shield, wherein the rotary shaft moves in a linear trajectory and axially rotatable, and the other end of the fixing pin is fixed to any one of the rotary shaft support portions.

4. The apparatus of claim 2, wherein the rotation guide groove is formed in at least one of end of the rotary shaft of the shield.

5. The apparatus of claim 1, further comprising:

a restoring spring positioned to be compressed or stretched when the rotary shaft moves in a linear trajectory, wherein the restoring spring returns the rotary shaft using elastic restoring force generated while being compressed or stretched, when supply of the current applied to the coil section is interrupted.

6. The apparatus of claim 1, wherein the coil section surrounds the rotary shaft having an interior peripheral surface of the coil section separated from an exterior peripheral surface of the rotary shaft by a pre-determined distance.

7. The apparatus of claim 3, wherein the base plate includes the coil support portion formed between the rotary shaft support portions separated from each other at both sides of the base plate, to fix the coil section.

* * * * *